(12) United States Patent
Izadpanah et al.

(10) Patent No.: US 7,020,396 B2
(45) Date of Patent: Mar. 28, 2006

(54) OPTO-ELECTRONIC ULTRA-WIDEBAND SIGNAL WAVEFORM GENERATOR AND RADIATOR

(75) Inventors: Hossein Izadpanah, Newbury Park, CA (US); Jonathan Lynch, Oxnard, CA (US); Mehran Mokhtari, Thousand Oaks, CA (US); Keyvan Sayyah, Santa Monica, CA (US)

(73) Assignee: HRL Laboratories, LLC, Malibu, CA (US)

( * ) Notice: Subject to any disclaimer, the term of this patent is extended or adjusted under 35 U.S.C. 154(b) by 691 days.

(21) Appl. No.: 10/256,095

(22) Filed: Sep. 25, 2002

(65) Prior Publication Data

US 2003/0202794 A1    Oct. 30, 2003

Related U.S. Application Data

(60) Provisional application No. 60/375,569, filed on Apr. 24, 2002.

(51) Int. Cl.
*H04J 14/02* (2006.01)
*H04B 10/142* (2006.01)

(52) U.S. Cl. ............... 398/66; 398/32; 398/68; 398/69; 398/70; 398/71; 398/74; 398/75; 398/76; 398/77; 398/79; 398/115; 398/182; 398/183

(58) Field of Classification Search ............... 398/115, 398/79, 68–71, 66, 74–77, 32, 182–183
See application file for complete search history.

(56) References Cited

U.S. PATENT DOCUMENTS

| 5,153,762 A | * | 10/1992 | Huber ............... 398/66 |
| 5,363,221 A |   | 11/1994 | Sutton et al. |
| 2003/0058499 A1 | * | 3/2003 | Reingand et al. ...... 359/135 |

FOREIGN PATENT DOCUMENTS

FR    2771222 A    5/1999

* cited by examiner

*Primary Examiner*—Jason Chan
*Assistant Examiner*—Danny Wai Lun Leung
(74) *Attorney, Agent, or Firm*—Tope-McKay & Associates (57) ABSTRACT

A method and apparatus for generating an arbitrary UWB waveform are presented. An optical comb generator generates a serial stream of optical tones and an optical beating tone. A serial-to-parallel converter receives the serial tones and converts them into parallel optical tones. A spatial light modulator receives the parallel optical tones, and independently adjusts at least one of the phase and amplitude of each to generate the components of an arbitrary waveform. Next, each one of a plurality of optical-to-electrical converters receives a parallel optical tone and the selected optical beating tone, which are beat with the optical beating tone, producing electrical notes, representing differences between each parallel optical tones and the optical beating tone. Each antenna element is connected to receive an electrical note and to launch a signal based thereon, such that the launched signals are superimposed to the arbitrary waveform signal.

25 Claims, 9 Drawing Sheets

OPTO-ELECTRONIC ULTRA-WIDEBAND SIGNAL WAVEFORM GENERATOR AND RADIATOR

PRIORITY CLAIM

The present invention claims priority to provisional application No. 60/375,569, titled "Opto-Electronic UWB Radio Waveform Generator and Transmitter", filed with the U.S. Patent and Trademark Office on Apr. 24, 2002.

BACKGROUND (1) Technical Field

The present invention relates to the field of optical and radio communications. More specifically, the present invention relates to a mechanism for generating arbitrary waveforms by combining a plurality of harmonics belonging to a comb generator impulse signal.

(2) Discussion

Radio transmissions are currently used to send signals, i.e. waveforms, over the air for receipt by receivers. One of the chief difficulties suffered by radio systems is providing a faithful reproduction of the signal to be broadcast. Current radios suffer from inadequate ability to reproduce incoming waveforms, particularly complex waveforms, and from wide-bandwidth signal forces.

It is therefore desirable to provide a radio transmission mechanism that can faithfully reproduce an arbitrary signal waveform and that is capable of utilizing a wide bandwidth.

SUMMARY

The present invention provides a method and an apparatus for generating an arbitrary ultra-wideband waveform. In one aspect, the present invention provides an apparatus comprising components. An optical comb generator generates a serial stream of optical tones, one of which is selected as an optical beating beating tone. A serial to parallel converter is connected with the optical comb generator for receiving the serial optical tones therefrom and for converting the serial optical tones into a plurality of parallel optical tones. A spatial light modulator is connected with the serial-to-parallel converter for receiving the parallel optical tones, and for independently adjusting at least one of the phase and amplitude of each of the parallel optical tones to generate the constituent components of an arbitrary waveform. Additionally, a plurality of optical-to-electrical converters are provided, with each connected to receive one of the parallel optical tones and the optical beating tone and to beat the parallel optical tone with the optical beating tone, thus producing a plurality of electrical beat notes, with each electrical beat note representing the difference between the parallel optical tone and the optical beating tone. Also, at least one transmitter array including a plurality of antenna elements is provided, with each antenna element connected to receive an electrical beat note, and to launch a signal based the electrical note, with the plurality of electrical notes being launched by the at least one transmitter array, such that a sum of the launched signals form a superimposed signal in free space, forming a user-determinable arbitrary waveform.

In another aspect, the at least one transmitter array is selected from a group consisting of radio-frequency transmitters and infrared transmitters.

In a further aspect, the optical comb generator is a device generating an optical multi-spectra comb, with the comb optical tones being locked in phase.

In a still further embodiment, the optical comb generator is selected from a group consisting of mode locked lasers and phase-locked multi-tone photonic oscillators.

In yet another aspect, the serial-to-parallel converter is a device selected from the group consisting of optical dispersive gratings, array waveguide gratings, and an array of laser diodes where each laser diode is optically injection-locked to an individual serial tone from the optical comb generator.

In a still further embodiment, the components of the apparatus are fabricated onto a hybrid circuit board.

Each of the functions of the apparatus discussed above can also correspond to steps in a method for generating an arbitrary ultra-wideband waveform.

BRIEF DESCRIPTION OF THE DRAWINGS

The objects, features and advantages of the present invention will be apparent from the following detailed descriptions of the various aspects of the invention in conjunction with reference to the following drawings.

DETAILED DESCRIPTION

The present invention relates to field of radio and optical communications. More specifically, the present invention relates to a mechanism for generating arbitrary waveforms by combining a plurality of Fourier components belonging to an impulse signal and to a mechanism for faithfully radiating the signal waveform into the air via antenna elements. The following description, taken in conjunction with the referenced drawings, is presented to enable one of ordinary skill in the art to make and use the invention and to incorporate it in the context of particular applications. Various modifications, as well as a variety of uses in different applications, will be readily apparent to those skilled in the art, and the general principles defined herein, may be applied to a wide range of aspects. Thus, the present invention is not intended to be limited to the aspects presented, but is to be accorded the widest scope consistent with the principles and novel features disclosed herein. Furthermore it should be noted that unless explicitly stated otherwise, the figures included herein are illustrated diagrammatically and without any specific scale, as they are provided as qualitative illustrations of the concept of the present invention.

In order to provide a working frame of reference, first a glossary of terms used in the description and claims is given as a central resource for the reader. Next, a discussion of various physical aspects of the present invention is provided. Finally, a discussion is provided to give an understanding of the specific details.

(1) Glossary

Before describing the specific details of the present invention, a centralized location is provided in which various terms used herein and in the claims are defined. The glossary provided is intended to provide the reader with a feel for the intended meaning of the terms, but is not intended to convey the entire scope of each term. Rather, the glossary is intended to supplement the rest of the specification in more accurately explaining the terms used.

Beating—The combining of two or more frequencies incident on a photo diode (a non-linear element) to produce sum and difference frequencies (called beats). In the case of the present invention, the difference frequencies are intended to provide lower frequencies than those used in the optical domain in order to prepare for launching into free space by an antenna.

Note—The term "note", as used herein is intended to refer to the electrical difference frequency obtained by combining (beating) the harmonics $\lambda_1, \lambda_2, \ldots, \lambda_n$ with a base or reference wavelength $\lambda_0$ on an array of photodiodes in preparation for launching into free-space by an antenna. Although the base wavelength used throughout this discussion is $\lambda_0$, any of the tones $\lambda_0, \lambda_1, \lambda_2, \ldots, \lambda_n$ may be used as the base wavelength to the same effect.

Tone—As used herein, this term is intended to refer to optical wavelengths generated by a comb generator as well as their electrical signal counterparts generated from the optical wavelengths by optical-to-electrical converters such as photodiodes. Optical tones are represented as $\lambda_0, \lambda_1, \lambda_2, \ldots, \lambda_n$, where, generally, $\lambda_0$ is a base wavelength and $\lambda_1, \lambda_2, \ldots, \lambda_n$ are the harmonics of the base wavelength.

(2) Discussion (a) The Method Aspect

The present invention may be viewed from the perspective of a method comprising a plurality of steps. The steps in the method are depicted in the flow diagram of FIG. 1. The first step in the method is performed by generating a serial stream of optical tones, one of which is selected as a base or reference optical beating tone 100. After the generating step 100 is performed, a step is performed for converting the serial optical tones into a plurality of parallel optical tones 102. Subsequently, a step of independently adjusting at least one of the phase and amplitude of each of the parallel optical tones to generate the constituent components of an arbitrary waveform 104 is performed. Next, a step of beating each optical tone with the optical beating tone to produce a plurality of electrical beat notes is performed, with each resulting electrical note representing the difference between the optical tone and the optical beating tone 106. Finally, in order to faithfully create the arbitrary signal waveform, a step of launching a signal based on each optical note is performed such that a sum of the launched signals forms a superimposed signal in free space 108, thus forming a user-determinable arbitrary signal waveform for receipt by receivers.

(b) The Radio System

The present invention provides an architecture that enables the generation of arbitrary signal waveforms from a set of impulses. In one aspect, the present invention provides an integrated ultra-wideband (UWB) radio impulse transmitter operating in the radio-frequency (RF) and millimeter-wave (0.1–140 GHz) bands as well as in the infrared (IR) bands. The UWB impulse radio provides a user with the ability to tune the radio reach, resolution, and beam direction through programmable impulse width, shape, and repetition rate. Photonic multi-wavelength comb generation, high resolution and compact optical demultiplexing devices, and optical heterodyne high-frequency signal generation are combined to deliver an ultra-wide frequency spectrum in conjunction with a low-profile printed circuit antenna arrays for impulse radiation.

Figure 2:
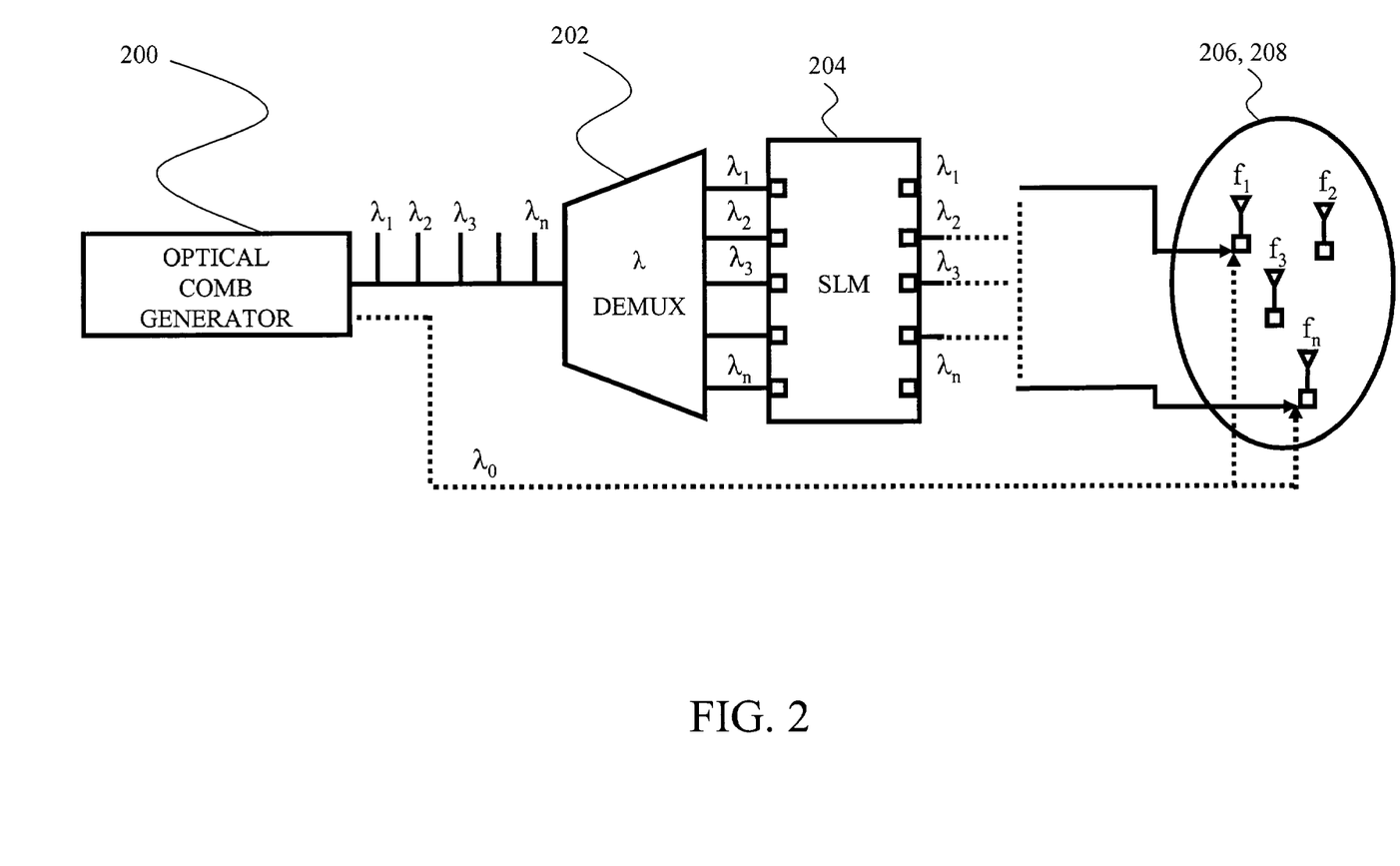
FIG. 2 is a block diagram of the opto-electronic ultra-wideband radio arbitrary waveform generator and radiator of the present invention.

A block diagram of the opto-electronic ultra-wideband radio arbitrary waveform generator of the present invention is shown in FIG. 2. An optical comb generator 200 generates a serial plurality of coherent optical wavelengths (serial optical tones) in a single stream at a desired wavelength spacing (inter-modial), which is imposed by the ultimate arbitrary pulse waveform. A variety of devices may be selected for the optical comb generator 200, non-limiting examples including a mode-locked laser (MLL) or a phase-locked multi-tone photonic oscillator. For simplicity, the optical tones are represented by wavelengths $\lambda_0, \lambda_1, \lambda_2, \ldots, \lambda_n$, where $\lambda_0$ is a base wavelength (tone) and $\lambda_1, \lambda_2, \ldots, \lambda_n$ are the harmonics of the base wavelength.

The plurality of serial tones, $\lambda_0, \lambda_1, \lambda_2, \ldots, \lambda_n$, are subsequently spatially separated using a serial-to-parallel converter (i.e., a wavelength demultiplexer) 202 to produce a plurality of parallel tones $\lambda_0, \lambda_1, \lambda_2, \ldots, \lambda_n$. Non-limiting examples of serial-to-parallel converters that may be used for this purpose include fiber Bragg gratings, array waveguide gratings (AWGs), and optical filters. Alternately, an array of laser diodes can be used instead of the grating, with each laser diode in the array being optically locked to an individual tone of the serial optical tones generated by the optical comb generator 200.

The spatially separated harmonics are then imaged onto individual pixels of a spatial light modulator (SLM) 204, which is capable of independently altering the amplitude and/or phase of each of the parallel optical tones. An example SLM 204 is a linear array of light-modulating pixels where the phase and/or amplitude transmission function of each pixel is independently controlled using an appropriate signal so that an arbitrary waveform specified by a user may be reproduced by the radio. Thus, given a plurality of parallel optical tones, the SLM 204 can manipulate the phase and/or amplitude of each such that each harmonic becomes a phase or amplitude-controlled individual component of an arbitrary waveform to be later combined.

Following the setting of a desired phase and amplitude alteration in the SLM 204, the optical carriers are each heterodyned (beat) with a reference optical carrier, preferably the base wavelength $\lambda_0$ in an array of photodiodes, resulting in a plurality of electrical tones. Note that although use of the wavelength $\lambda_0$ as the base wavelength (tone) is desirable, any of the harmonics or the base wavelength may be used as the reference carrier with the others being passed through the SLM 204 with the same effect. Herein, although this generalization may be used for conciseness and clarity of explanation, the base wavelength (tone) discussed will be $\lambda_0$. The reference carrier is phase-locked to each of the optical tones from the comb generator 200. A plurality of photodetectors (photodiodes) 206 is shown for performing optical mixing. The photodetectors 206 convert the optical tones to corresponding parallel electrical tones, each of which is transmitted from an antenna in an array of antennas 208. Each of the parallel electrical tones is preferably a radio-frequency (RF) tone that resonates with its corresponding antenna in the array of antennas 208. Since the optical tones are each phase-locked to each other as well as to the reference optical carrier (the base wavelength $\lambda_o$), the generated RF tones are also phase-locked to each other and have very good spectral purity and phase noise characteristics.

Each opto-electronic converter (i.e., the photodetectors 206) performs two functions: (i) beating two incident optical components to generate a difference electrical note and (ii) converting photonic energy to electronic energy, which is injected into a corresponding antenna element for each radiating frequency component. The photodiodes 206 preferably comprise an array of PIN or uni-traveling photodetectors with each photodiode 206 connected with an antenna element of an array of antennas 208 fabricated on a hybrid PCB board. Each element of the array of photodiodes 206 is preferably a tuned transceiver, optimized for the narrowband processing or operation at a single millimeter wave wavelength. The array of antennas 208 will be discussed further below.

(c) Impulse Antenna Configurations

Figure 3A:
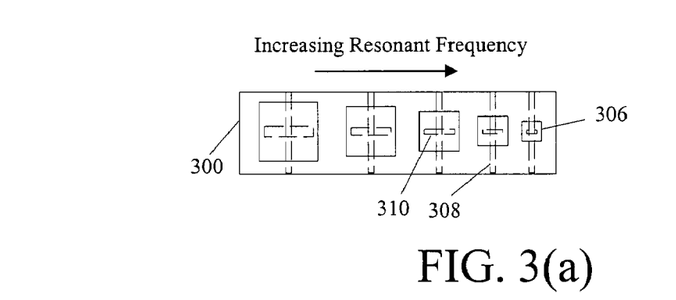
FIG. 3(a) is a schematic top view of a one-dimensional, linearly arranged patch antenna array for use with the present invention.
Figure 3B:
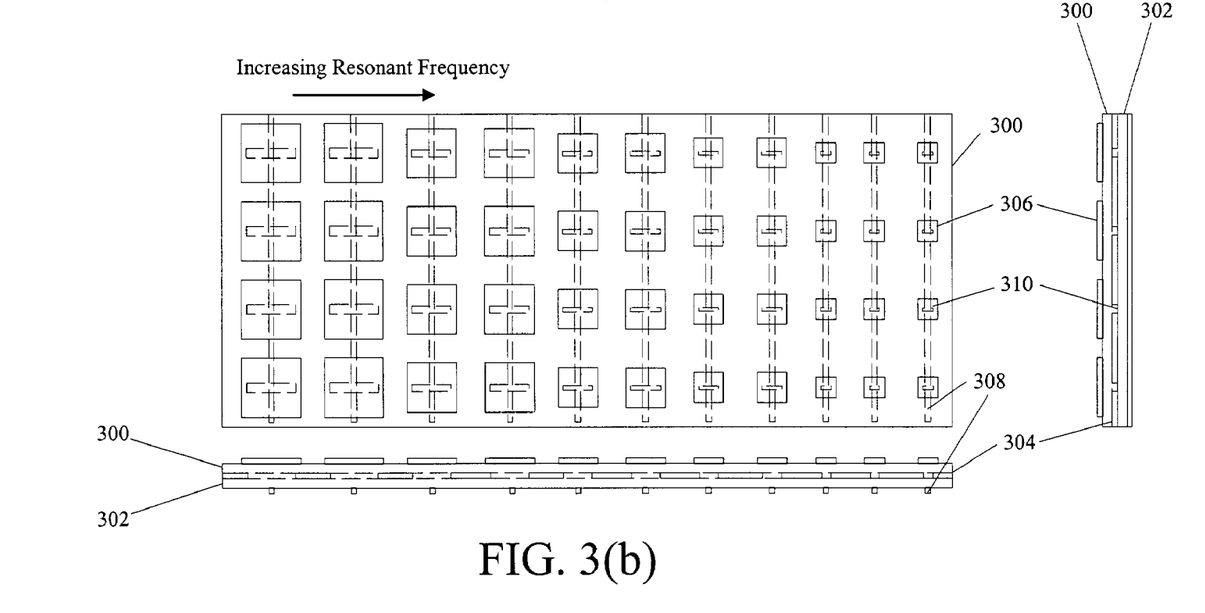
FIG. 3(b) is a schematic providing top and side views of a two-dimensional, linearly arranged patch antenna array for use with the present invention.
Figure 3C:
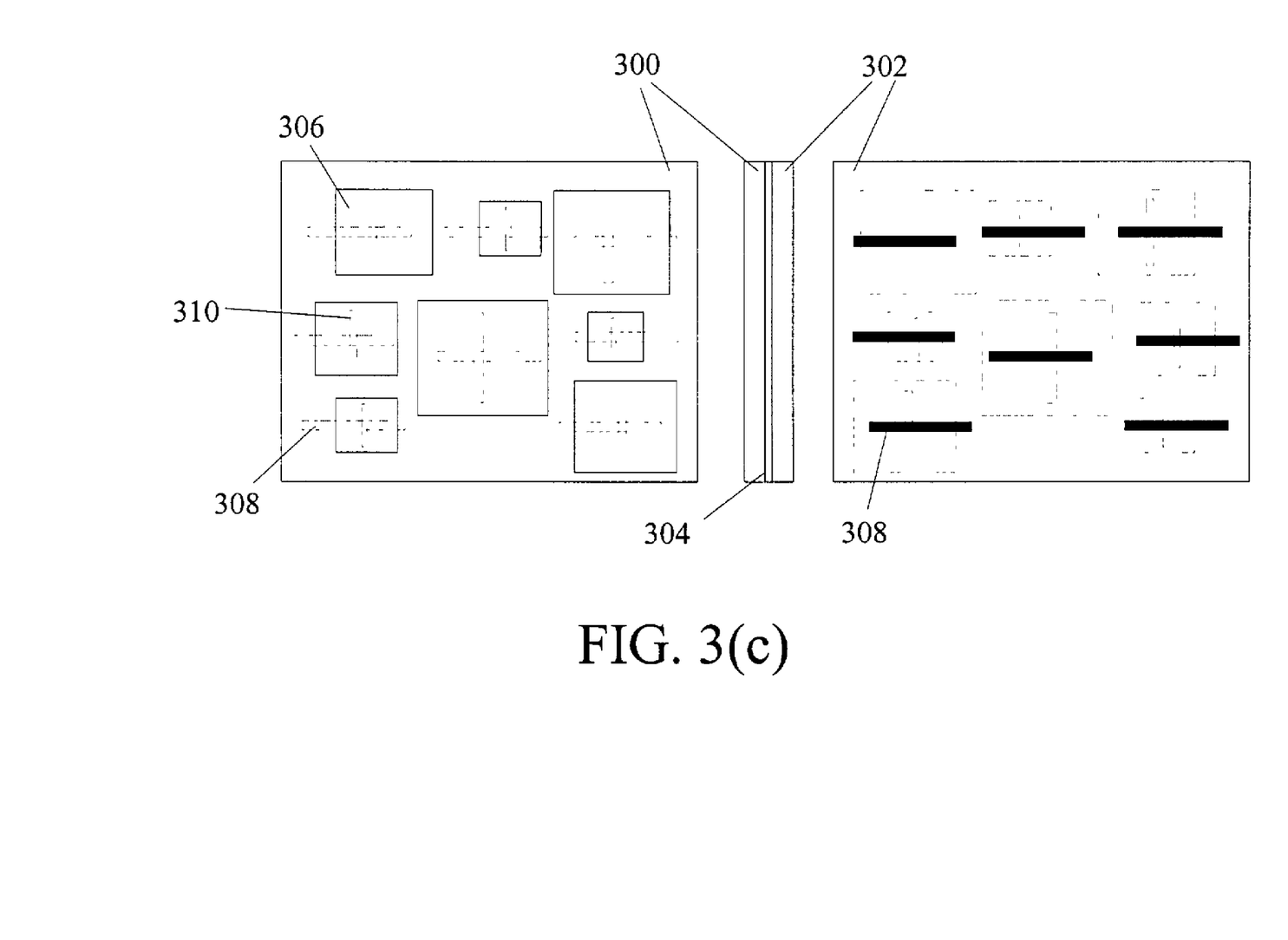
FIG. 3(c) is a top, side, and bottom view of a two-dimensional, randomly arranged patch antenna array for use with the present invention.

The UWB antenna array design is an important component for an effective impulse radio system. The desired antenna design takes advantage of the comb spectrum produced by down conversion of the multi-tone optical signal to provide wideband (i.e. short duration) RF pulses of energy in the radiation field. Such an antenna 208 can be implemented using standard printed circuit board techniques, and includes a plurality of radiating elements, each assigned to a different part of the frequency spectrum present in the comb. Thus, the operating frequency range and bandwidth of the antenna 208 is limited primarily by the number of array elements. A side benefit of this antenna configuration is that full antenna gain is preserved due to the coherent addition of frequency components that comprise the electromagnetic energy of each frequency component. Three example configurations of this antenna 208 include those formed as a one-dimensional linear patch antenna array, as a two-dimensional linearly distributed patch antenna array, and as a two-dimensional non-linearly distributed patch antenna array. These configurations are described below, and are shown in FIG. 3(a), FIG. 3(b), and FIG. 3(c), respectively.

The Ultra Wideband Impulse Antenna (UWIA) used with the present invention preferably consists of a number N of narrowband radiating elements, each of which is tuned to a frequency tone of the opto-electronically generated electrical harmonic spectrum. One attractive choice for radiating elements is aperture coupled patch antennas elements 306, as shown in FIG. 3(a), FIG. 3(b), and FIG. 3(c). This type of antenna can be produced at low cost using standard printed circuit board techniques, resulting in a very low height. The antenna array in the example shown consists of two printed circuit boards 300 and 302 separated by a ground plane layer 304. The radiating patch antenna elements 306 reside on one side of the ground plane and the microstrip feed circuitry 308 resides on the opposite side. The patch antenna elements 306 are coupled to the feed lines through apertures 310 in the ground plane 304. The size of each of the patch antenna elements 306 determines its resonant frequency, and the patch sizes are designed so that the resonant frequencies of the totality of patches cover a particular frequency range with equal frequency intervals. This discussion, with noted exceptions, is applicable to all three aspects shown.

Figure 4:
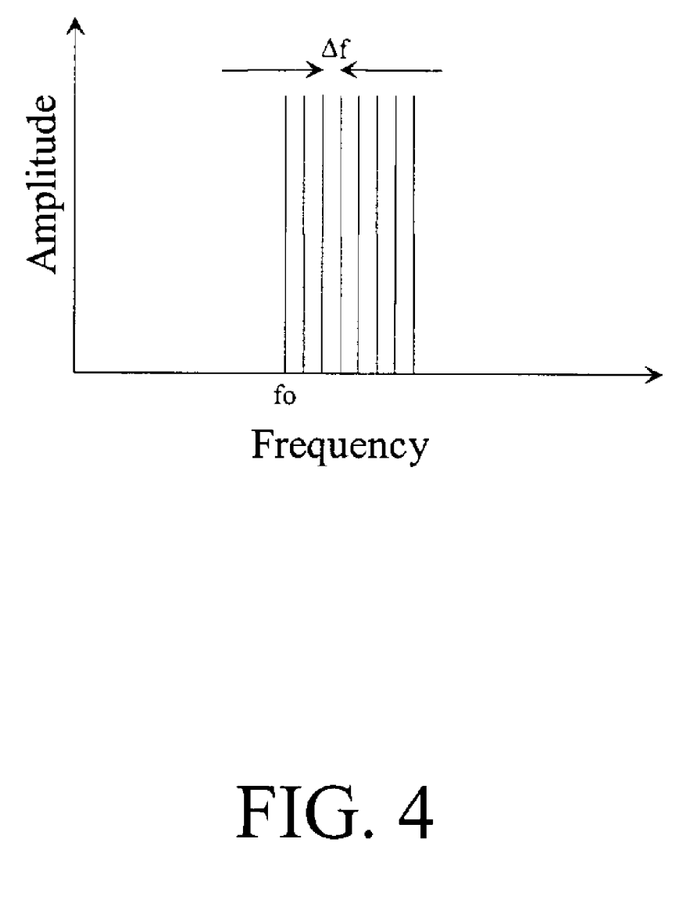
FIG. 4 is a graph depicting an optical and/or electrical comb spectrum having uniform separation between components (tones), representing input to a patch antenna array for use with the present invention.

Each patch antenna element 306 is fed a narrowband signal that lies near the resonant frequency of the particular patch, and that signal is then radiated from the patch element. In order to produce a radiated impulse, the input signals must be conditioned properly before feeding to the patch antenna elements 306. The frequency spectrum of the totality of input signals must be a "comb" spectrum, consisting of a series of narrowband frequency components with a uniform frequency separation between components ($\Delta f$), as shown in FIG. 4. This comb spectrum can be expressed mathematically by describing the input signal to the $n^{th}$ antenna (using complex notation) as $s_n = A_n e^{j\theta_n}$, with the phase given by $\theta_n = (\omega_o + n\Delta\omega)t + \phi_n$, with $n = 0, 1, \ldots N-1$. The condition that must hold in order to produce an impulse train is that the adjacent spectral phase difference $\phi_{n+1} - \phi_n = \Delta\phi$ be identical for all n.

With these signals forming the inputs to the patch antennas, the radiation field of the antenna array can be computed. For this purpose a Cartesian coordinate system may be constructed with the array lying in the x-y plane. The individual patch antennas 306 may be located with the coordinates $x'_n, y'_n$. Note that the number of patch antennas 306 is equal to the number of spectral components, as is expected since each patch antenna 306 radiates exactly one spectral component. The radiated fields far from the antenna can be computed using standard antenna theory, and the result is $$\psi \cong \frac{1}{4\pi r} \sum_n A'_n e^{j(\omega_o + n\Delta\omega)[t - \frac{1}{c}[r - \sin(\theta)(x'_n \cos(\phi) + y'_n \sin(\phi))]]},$$

where $r, \theta, \phi$ are the spherical polar coordinates locating the observation point. The electromagnetic fields are proportional to the wave function $\psi$.

In order to understand the form of the radiating field it helps to make some simplifying assumptions, which would be relaxed in the development of a particular aspect. First, it is assumed that all of the antenna elements 306 have the same amplitude, $A'_n = 1$. In practice, the amplitudes are purposely altered in order to reduce sidelobe levels. Second, it is assumed that the total bandwidth is much less than the carrier frequency, $N\Delta\omega << \omega_o$. Note that second-order corrections may have to be made to this simple analysis. Third, a one dimensional array, $y'_n = 0, \phi = 0$ will be considered. Generalization to two dimensional arrays is straightforward. With these assumptions the wave function takes the form $$\psi \cong \frac{e^{j\omega_o(t-r/c)}}{4\pi r} \sum_n e^{j(n\Delta\omega(t-r/c) + \frac{\omega_o}{c} x'_n \sin(\theta))}.$$

If the radiating elements are physically arranged in order of increasing frequency as shown in FIG. 3(a) and FIG. 3(b), where $x'_n = n\Delta x$, then wave function becomes $$\psi \cong \frac{e^{j\omega_o(t-r/c)}}{4\pi r} \frac{\sin\left(\frac{N}{2}\left(\Delta\omega(t-r/c) + \frac{\omega_o}{c}\Delta x \sin(\theta)\right)\right)}{\sin\left(\frac{1}{2}\left(\Delta\omega(t-r/c) + \frac{\omega_o}{c}\Delta x \sin(\theta)\right)\right)}.$$

This function describes a series of impulses in both space and time with a duty cycle of approximately 1/N. The pulse peak occurs when and where $\Delta\omega(t-r/c)+\omega_o/c\Delta x \sin(\theta)$ is a multiple of $\pi$. If the time t is fixed, it may be seen that the pulse peaks form a spiral pattern about the origin. This is due to the fact that the array radiates a narrow beam of energy in a direction that rotates about the origin at a constant angular rate. Thus the outward propagating energy sweeps out a spiral pattern.

If the radiating elements are not arranged in this particular order, as shown in FIG. 3(c), coherent addition of the element radiation will occur only in the broadside (z) direction. Thus pulses of energy will be radiated away from the array in a narrow angular range, determined by the array size. The amount of energy that is radiated in other directions and between pulse peaks depends strongly on the choice of arrangement of the radiating antenna elements 306.

(d) Miniaturization

Figure 1:
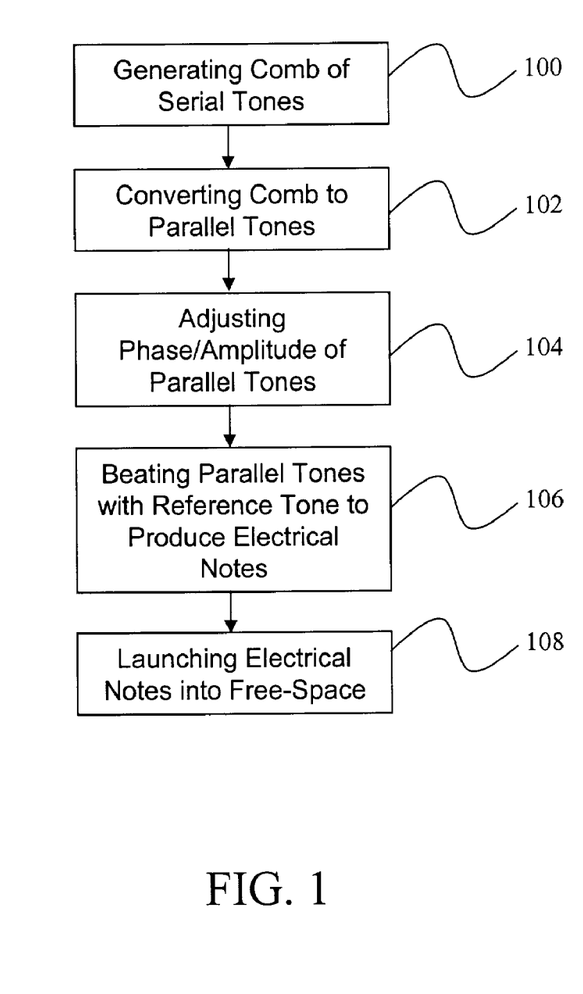
FIG. 1 is a flow diagram depicting steps in a method aspect of the present invention.

The functional blocks of the present invention shown in FIG. 1 can also be integrated onto a hybrid board, comprising, for example, an integrated optical circuit and a PCB patch antenna board, in which the optical polymer interconnection waveguides, the photodiodes, and the corresponding interconnected antenna arrays are fabricated on the same substrate, resulting in a compact low weight impulse radio unit. This compact form of the present invention, produced by standard techniques, provides an opto-electronic UWB arbitrary pulse waveform generator that can be less than 2×2 inches in area.

Figure 5:
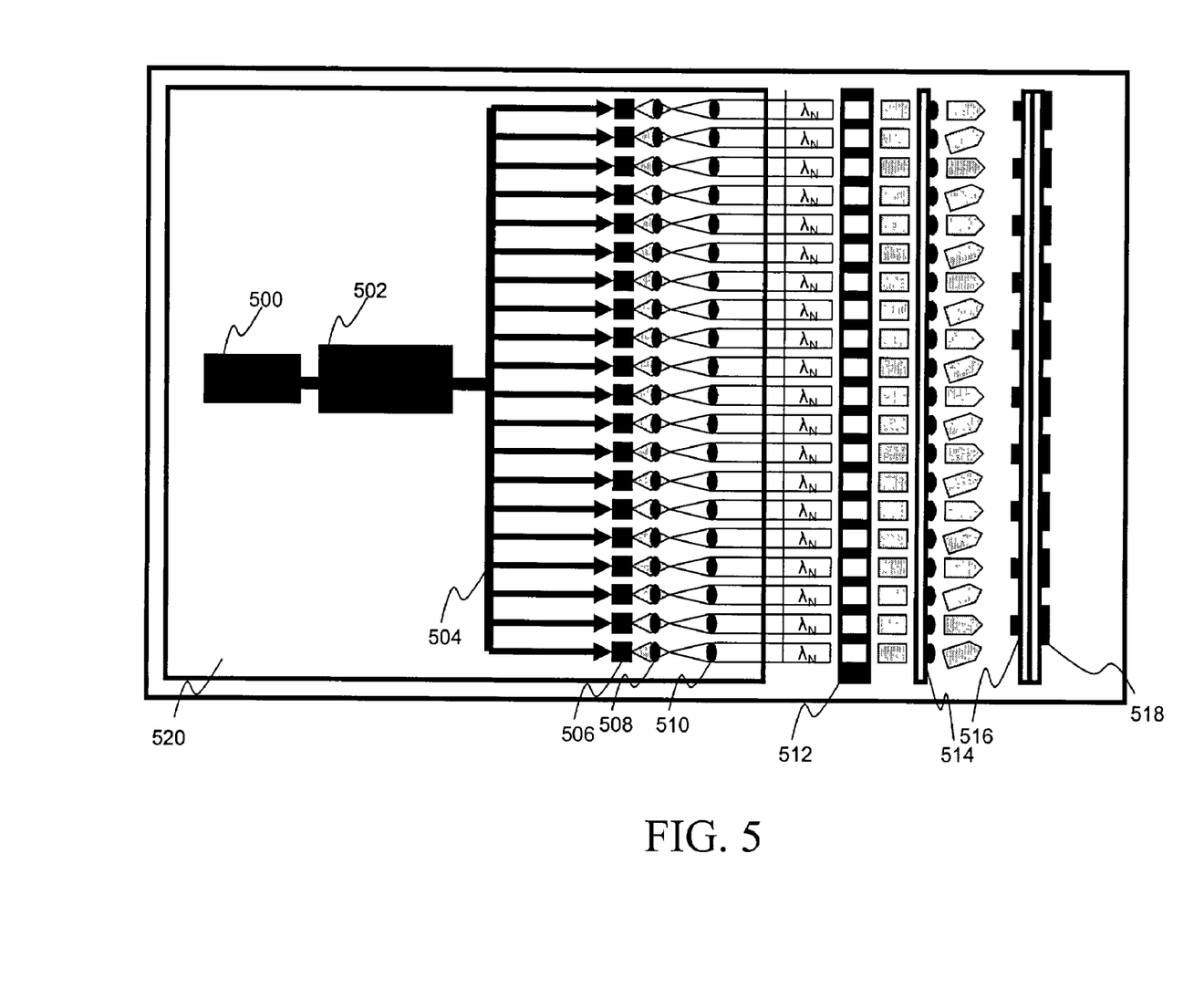
FIG. 5 is a schematic diagram depicting a compact realization of an aspect of the present invention.
Figure 6A:
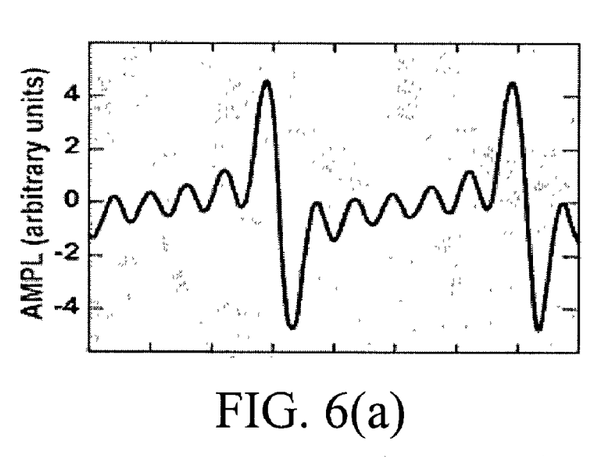
FIGS. 6(a), (b), (c), (d), (e), and (f) are images of signal waveforms produced by the present invention.
Figure 6B:
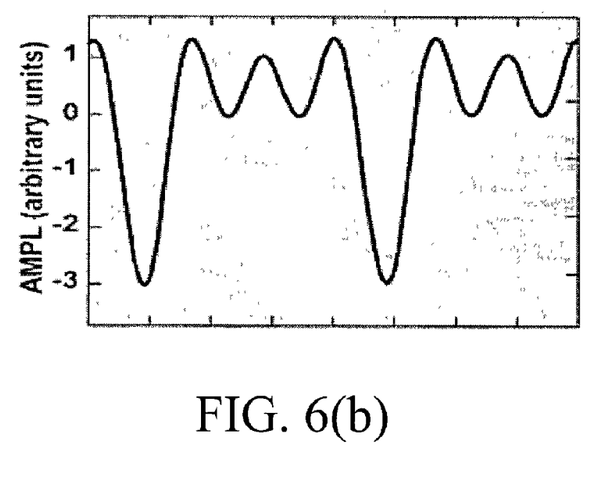
Figure 6C:
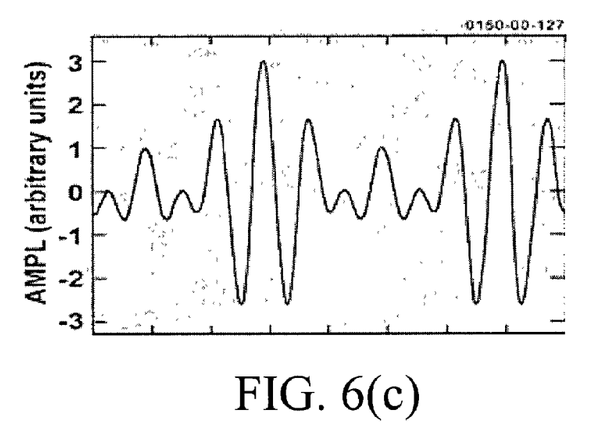
Figure 6D:
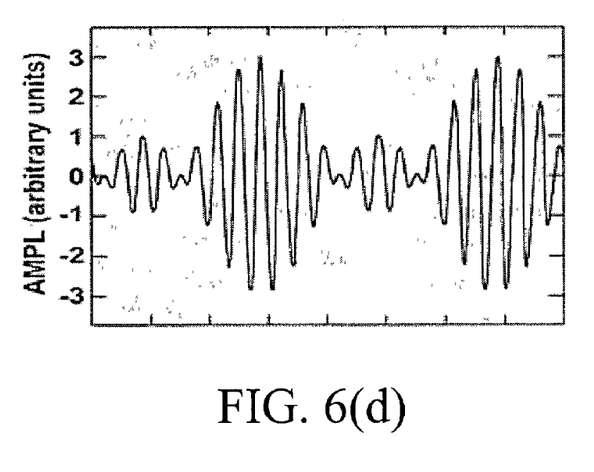
Figure 6E:
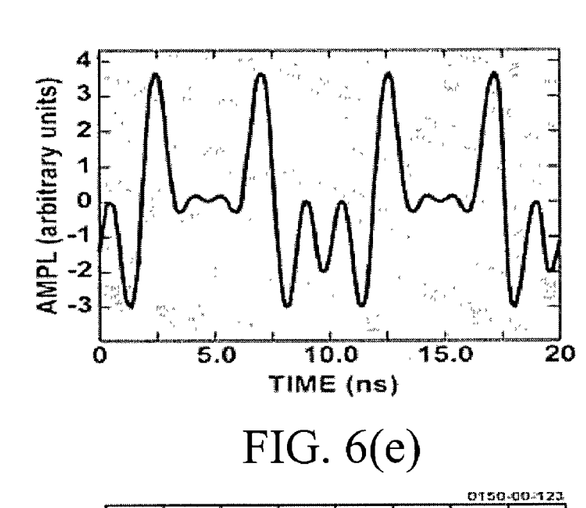
Figure 6F:
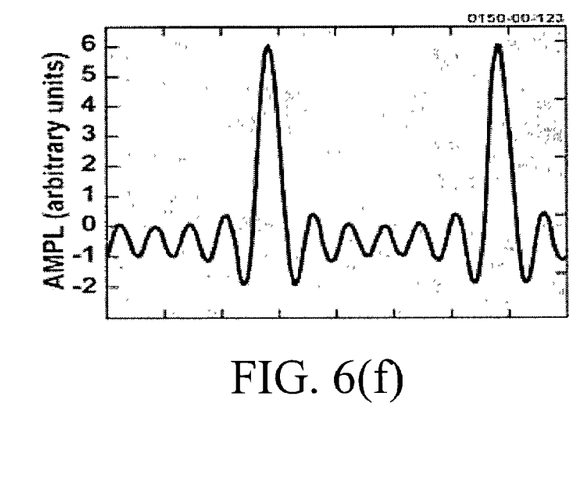

A compact realization of the present invention is depicted in the schematic diagram in FIG. 5. The aspect shown comprises an optical comb generator 500 (preferably a mode-locked laser as mentioned previously), a semiconductor optical modulator 502, an array of waveguides 504, an array of distributed feedback (DFB) lasers 506, an array of miniature optical isolators 508, a first array of microlenses 510, a small phase-modulating SLM 512, a second array of microlenses 514, an array of photodetectors 516, and an antenna array 518. Alternate DFB laser chips in the device are optically injection-locked to consecutive optical tones of the optical comb generator 500 (harmonics $\lambda_1, \lambda_2, \ldots, \lambda_n$), having a specified wavelength spacing. The other alternate DFB laser chips are all injection-locked to a single tone from the optical comb generator 500, serving as the base tone (i.e., the base wavelength $\lambda_0$, as generally discussed herein). The laser diodes 506 are coupled and optically injection-locked to the optical tones of the optical comb generator 500 using an array of short integrated optical waveguides close to their input facets. In one design, where an MLL is used, the MLL 500, the optical modulator 502, the array of waveguides 504, and the DFB lasers 506 are all integrated on the same substrate 520. The semiconductor optical modulator 502 is used for high-speed data modulation of the impulse waveform. The output light of all the DFB laser chips, after optical collimation and isolation using isolators 508 and the first array of microlenses 510, is transmitted through the pixels of a small phase modulating SLM 512, where only the phases of the parallel optical tones $\lambda_1, \lambda_2, \ldots, \lambda_n$ are modulated. The phases of the other alternate lasers that serve as the base tone $\lambda_0$ are not modified. The second array of microlenses 514 focuses each parallel optical tone $\lambda_1$, $\lambda_2, \ldots, \lambda_n$ and its accompanying base wavelength $\lambda_0$ to a high-speed photodiode, i.e. a photodetector in the array of photodetectors 516, located at the focal point of the second array of microlenses 514, as shown in FIG. 5 for converting each optical tone into a corresponding electrical note by beating the corresponding optical tone with the base tone, and for converting the optical tones into electrical tones. Finally, each photodiode in the array of photodetectors 516 is electrically connected with an impedance-matched patch antenna element in the antenna array 518 in order to launch each electrical note into freespace where they are superimposed to generate a user-selected arbitrary waveform.

This compact device is capable of generating and transmitting an arbitrary pulse radio waveform by utilizing its full control of both the amplitude and phase of the optical Fourier components of the resulting waveform. The amplitude modulation is achieved by varying the laser diode injection current and the phase modulation is obtained by the optical phase retardation capability of the SLM 512. The area required for the device is less than 20×20 mm for an arbitrary radio waveform generator with 10 harmonic components and less than 40×20 mm for a generator with 20 harmonic components. This is because each laser diode (which currently may be up to 500 μm long) is mounted on a miniature (1×1 mm) thermoelectric cooler (TEC). The TEC is required in order to control the temperature, and hence the wavelength, of each DFB laser for injection locking to the appropriate line of the optical comb generator 500.

(e) Example Waveforms

A set of example waveforms generated by the present invention is shown in FIG. 6. Signal waveforms are shown in FIGS. 6(a), (b), (c), (d), (e), and (f). The present invention can be used to generate any arbitrary waveform desired.

What is claimed is:

1. An apparatus for generating an arbitrary ultra-wideband waveform, the apparatus comprising components including:
    an optical comb generator for generating a serial stream of optical tones, one of which is selected as an optical beating tone;
    a serial-to-parallel converter connected with the optical comb generator for receiving the serial optical tones therefrom and for converting the serial optical tones into a plurality of parallel optical tones, each having a phase and an amplitude;
    a spatial light modulator connected with the serial-to-parallel converter for receiving the parallel optical tones, and for independently adjusting at least one of the phase and amplitude of each of the parallel optical tones to generate the constituent components of an arbitrary waveform;
    a plurality of optical-to-electrical converters, each connected to receive one of the parallel optical tones and the optical beating tone and to beat the respective parallel optical tone with the optical beating tone, the plurality of optical-to-electrical converters thus producing a plurality of electrical notes, with each electrical note representing the difference between the parallel optical tone and the optical beating tone; and
    at least one transmitter array including a plurality of antenna elements, with each antenna element connected to receive an electrical note and to launch a signal based on the electrical note, with the plurality of electrical notes being launched by the at least one transmitter array such that a sum of the launched signals form a superimposed signal in free space, forming a user-determinable arbitrary waveform.

2. An apparatus for generating an arbitrary ultra-wideband waveform as set forth in claim 1, wherein the at least one transmitter array is selected from a group consisting of radio-frequency transmitters and infrared transmitters.

3. An apparatus for generating an arbitrary ultra-wideband waveform as set forth in claim 2, wherein the optical comb generator is a device generating an optical multi-spectra comb, with the comb optical tones being locked in phase.

4. An apparatus for generating an arbitrary ultra-wideband waveform as set forth in claim 2, wherein the optical comb generator is selected from a group consisting of mode locked lasers and phase-locked multi-tone photonic oscillators.

5. An apparatus for generating an arbitrary ultra-wideband waveform as set forth in claim 1, wherein the optical comb generator is a device generating an optical multi-spectra comb, with the comb optical tones being locked in phase.

6. An apparatus for generating an arbitrary ultra-wideband waveform as set forth in claim 1, wherein the optical comb generator is selected from a group consisting of mode locked lasers and phase-locked multi-tone photonic oscillators.

7. An apparatus for generating an arbitrary ultra-wideband waveform as set forth in claim 1, wherein the serial-to-parallel converter is a device selected from a group consisting of optical dispersive gratings, array waveguide gratings, and an array of laser diodes where each laser diode is optically injection-locked to an individual serial tone from the optical comb generator.

8. An apparatus for generating an arbitrary ultra-wideband waveform as set forth in claim 7, wherein the optical comb generator is a device generating an optical multi-spectra comb, with the comb optical tones being locked in phase.

9. An apparatus for generating an arbitrary ultra-wideband waveform as set forth in claim 7, wherein the optical comb generator is selected from a group consisting of mode locked lasers and phase-locked multi-tone photonic oscillators.

10. An apparatus for generating an arbitrary ultra-wideband waveform as set forth in claim 7, wherein the at least one transmitter array is selected from a group consisting of radio-frequency transmitters and infrared transmitters.

11. An apparatus for generating an arbitrary ultra-wideband waveform as set forth in claim 10, wherein the optical comb generator is a device generating an optical multi-spectra comb, with the comb optical tones being locked in phase.

12. An apparatus for generating an arbitrary ultra-wideband waveform as set forth in claim 10, wherein the optical comb generator is selected from a group consisting of mode locked lasers and phase-locked multi-tone photonic oscillators.

13. An apparatus for generating an arbitrary ultra-wideband waveform as set forth in claim 1, wherein the components of the apparatus are fabricated onto a hybrid circuit board.

14. A method for generating an arbitrary ultra-wideband waveform, the apparatus comprising the steps of:
  generating a serial stream of optical tones, one of which is selected as an optical beating beating tone;
  converting the serial optical tones into a plurality of parallel optical tones, each having a phase and an amplitude;
  independently adjusting at least one of the phase and amplitude of each of the parallel optical tones to generate the constituent components of an arbitrary waveform;
  beating each optical tone with the optical beating tone to produce a plurality of electrical notes, with each electrical note representing the difference between the respective optical tone and the optical beating tone; and
  launching a signal based on each electrical note such that a sum of the launched signals forms a superimposed signal in free space, forming a user-determinable arbitrary waveform.

15. A method for generating an arbitrary ultra-wideband waveform as set forth in claim 14, wherein the launching step is performed by use of a plurality of arrays of transmitters selected from a group consisting of radio-frequency transmitters and infrared transmitters.

16. A method for generating an arbitrary ultra-wideband waveform as set forth in claim 15, wherein the generating step is performed by generating an optical multi-spectra comb, with the comb optical tones being locked in phase.

17. A method for generating an arbitrary ultra-wideband waveform as set forth in claim 15, wherein the generating step is performed by use of an optical comb generator selected from a group consisting of mode locked lasers and phase-locked multi-tone photonic oscillators.

18. A method for generating an arbitrary ultra-wideband waveform as set forth in claim 14, wherein the generating step is performed by generating an optical multi-spectra comb, with the comb optical tones being locked in phase.

19. A method for generating an arbitrary ultra-wideband waveform as set forth in claim 14, wherein the generating step is performed by use of an optical comb generator selected from a group consisting of mode locked lasers and phase-locked multi-tone photonic oscillators.

20. A method for generating an arbitrary ultra-wideband waveform as set forth in claim 14, wherein the serial-to-parallel converting step is performed by use of a device selected from a group consisting of optical dispersive gratings, array waveguide gratings, and an array of laser diodes where each laser diode is optically injection-locked to an individual serial tone from the optical comb generator.

21. A method for generating an arbitrary ultra-wideband waveform as set forth in claim 20, wherein the generating step is performed by generating an optical multi-spectra comb, with the comb optical tones being locked in phase.

22. A method for generating an arbitrary ultra-wideband waveform as set forth in claim 20, wherein the generating step is performed by use of an optical comb generator selected from a group consisting of mode locked lasers and phase-locked multi-tone photonic oscillators.

23. A method for generating an arbitrary ultra-wideband waveform as set forth in claim 20, wherein the launching step is performed by use of a plurality of arrays of transmitters selected from a group consisting of radio-frequency transmitters and infrared transmitters.

24. A method for generating an arbitrary ultra-wideband waveform as set forth in claim 23, wherein the generating step is performed by generating an optical multi-spectra comb, with the comb optical tones being locked in phase.

25. A method for generating an arbitrary ultra-wideband waveform as set forth in claim 23, wherein the generating step is performed by use of an optical comb generator selected from a group consisting of mode locked lasers and phase-locked multi-tone photonic oscillators.

* * * * *